United States Patent [19]

Weise

[11] Patent Number: 4,871,781

[45] Date of Patent: Oct. 3, 1989

[54] POLYDIORGANOSILOXANES WHICH CAN BE CURED TO FORM ELASTOMERIC FOAMS

[75] Inventor: Carlos Weise, Burghausen, Fed. Rep. of Germany

[73] Assignee: Wacker-Chemie GmbH, Munich, Fed. Rep. of Germany

[21] Appl. No.: 181,871

[22] Filed: Apr. 15, 1988

[30] Foreign Application Priority Data

Apr. 16, 1987 [DE] Fed. Rep. of Germany ....... 3713130

[51] Int. Cl.$^4$ .................................................. C08J 9/02
[52] U.S. Cl. ...................................... 521/88; 521/116; 521/117; 521/134; 521/154
[58] Field of Search ................. 521/154, 88, 116, 117, 521/134

[56] References Cited

U.S. PATENT DOCUMENTS

| | | | |
|---|---|---|---|
| 4,590,222 | 5/1986 | Bauman | 521/154 |
| 4,762,859 | 8/1988 | Modic et al. | 521/154 |
| 4,767,794 | 8/1988 | Modic et al. | 521/154 |

*Primary Examiner*—Morton Foelak

[57] ABSTRACT

The invention relates to compositions comprising (A) polydiorganosiloxanes containing vinyl groups, (B) polyorganohydrogensiloxanes, (C) platinum catalysts, and (D) a saturated polyhydric alcohol having at least two hydroxyl groups per molecule, which can be cured at temperatures of from room temperature to over 100° C. by the addition of the Si-bonded H atoms in the polyorganohydrogensiloxane (B) to the vinyl groups in the polydiorganosiloxanes (A) with the aid of the platinum catalysts (C), to form elastomeric foams. The density and type of pores may be controlled by compound (D) containing hydroxyl groups as a "blowing agent".

8 Claims, No Drawings

4,871,781

POLYDIORGANOSILOXANES WHICH CAN BE CURED TO FORM ELASTOMERIC FOAMS

The present invention relates to elastomeric foams and more particularly to polydiorganosiloxanes compositions which can be crosslinked to form elastomeric foams.

BACKGROUND OF THE INVENTION

Compositions containing polydiorganosiloxanes, which can be cured to form elastomeric foams are well known in the art. The foams may be prepared by adding gas-generating additives to the curable compositions to produce uniform foaming of the compositions during the curing reaction. For example, in the curing reaction catalyzed by platinum or platinum compounds and based on polydiorganosiloxanes containing hydroxyl groups and polyorganohydrogensiloxanes, hydrogen is evolved, which initiates the foaming. In addition, curable compositions of this type can contain, for example, up to about 85 percent by weight of polydiorganosiloxanes having vinyl groups, which usually result in improved strength properties in the finished foams, as well as other additives which are generally present in platinum catalyzed compositions, such as fillers and curing inhibitors, for example, acetylene compounds, which are intended to prevent premature curing and to prolong the pot life of the compositions.

In U.S. Pat. No. 3,925,705 to Smith the polydiorganosiloxanes containing hydroxyl groups act as a "blowing agent" and are responsible for the formation of hydrogen as the "blowing gas". However, since these compounds are themselves polymers and are directly involved in the curing reaction as a result of crosslinking by means of the condensation reaction, it is difficult to control the foam formation under these conditions.

Improved foam control can be achieved if the polydiorganosiloxanes which contain hydroxyl groups and act as blowing agents in the compositions catalyzed by platinum are replaced wholly or in part by organic monohydric alcohols, and if the curing reaction takes place between the polydiorganosiloxanes containing vinyl groups and polyorganohydrogensiloxanes by means of the addition reaction such as described in U.S. Pat. Nos. 4,026,843 to Kittle and 4,026,844 to Kittle et al. In addition, it is also known from U.S. Pat. No. 4,189,545 to Modic that water can be used as the compound which contains hydroxyl groups in compositions of this type.

However, when mixed with monohydric alcohols, especially lower alcohols, curable compositions containing polyorganosiloxanes are flammable and additional safety measures are required when these compositions are processed. Polyorganosiloxane mixtures containing water, on the other hand, have only a limited stability on storage because of their poor miscibility. These disadvantages are not eliminated when the crosslinking is reduced in these curable compositions by selecting particular polyorganohydrogensiloxanes (cf. DE-A No. 3,443,677, which corresponds to EP-A No. 183,148).

Therefore, it is an object of the present invention to provide compositions which can be cured to form elastomeric foams. Another object of the present invention is to provide compositions having improved foam control. Another object of the present invention is to provide compositions which can be cured to form elastomeric foams of uniform pore structure. Still another object of the present invention is to provide highly flexible elastomeric foams having low combustibility. A further object of the present invention is to provide a method for controlling the foam density.

SUMMARY OF THE INVENTION

The foregoing objects and others which will become apparent from the following description are accomplished in accordance with this invention, generally speaking, by providing compositions which can be cured to form elastomeric foams comprising (A) polydiorganosiloxanes containing vinyl groups, (B) polyorganohydrogensiloxanes, (C) platinum catalysts and (D) a compound containing at least two hydroxyl groups per molecule. The resultant compositions can be cured at temperatures of from room temperature up to over 100° C. to form elastomeric foams.

DESCRIPTION OF THE INVENTION

The compositions of this invention which may be cured to form elastomeric foams may contain in addition to the polydiorganosiloxanes (A) having vinyl groups, polyorganohydrogensiloxanes (B), platinum catalysts (C) and compound (D), other constituents such as fillers, curing inhibitors and other additives which are readily miscible and are generally present in such compositions. The resultant compositions are storage stable, and as a result of the compositions having a low combustibility, can be processed safely and without changes in the properties.

The compositions can be crosslinked in a known manner at temperatures of from about room temperature up to over 100° C. by means of an addition reaction between the Si-bonded H atoms in organohydrogensiloxanes (B) and the vinyl groups present in the polydiorganosiloxanes (A), with the aid of the platinum catalysts (C), with simultaneous foaming, to form the elastomeric foams. It is possible to control the foaming by means of compound (D) containing hydroxyl groups, as a "blowing agent".

The curable compositions of the present invention can contain any desired polydiorganosiloxanes (A) having vinyl groups, for example, polydiorganosiloxanes which have terminal triorganosiloxy groups and at least 2 vinyl groups per molecule, along the chain, or, preferably, in the terminal groups, and the remaining organic radicals, which can be the same or different, are alkyl radicals having from 1 to 8 carbon atoms, aryl radicals or fluoroalkyl radicals having from 3 to 8 carbon atoms, preferably methyl, phenyl and/or trifluoropropyl radicals. The polydiorganosiloxanes (A) have viscosities in the range of from 200 to 15,000,000 mPa.s at 25° C.

Polydimethylsiloxanes containing terminal vinyldimethylsiloxy groups are especially preferred, depending on the method of processing the curable compositions, for example, as low-viscosity liquids of up to about 10,000 mPa.s at 25° C., or as high-viscosity compositions or more than about 500,000 mPa.s at 25° C., which are no longer capable of flow. These polydimethylsiloxanes are generally processed by means of extruders or calendars.

Polyorganohydrogensiloxanes (B), which can be used in the compositions are, for example, those which have a linear structure and contain at least 2 Si-H bonded groups per molecule, which are arranged along the chain or in the terminal groups, and the remaining organic radicals, which can be the same or different are alkyl radicals having from 1 to 8 carbon atoms, aryl radicals or fluoroalkyl radicals having from 3 to 8 carbon atoms, preferably methyl, phenyl and/or trifluoropropyl radicals. The polyorganohydrogensiloxanes (B) preferably have viscosities in the range of from 3 to 10,000 mPa.s at 25° C.

Polymethylhydrogensiloxanes (B) containing terminal trimethylsiloxy groups and having viscosities of from about 50 to 500 mPa.s at 25° C. are preferred.

The platinum catalysts (C) can be any desired platinum compounds, for example, hexachloroplatinic acid or reaction products of hexachloroplatinic acid and olefins or organosilicon compounds containing olefinic radicals, such as vinylsiloxanes, preferably divinyltetramethyldisiloxane.

The compounds (D) which contain hydroxyl groups and are used in accordance with this invention as blowing agents can be any desired organic compounds having at least two alcoholic hydroxyl groups per molecule, such as polyhydric alcohols, which are free from C=C multiple bonds, carbonyl groups and Si atoms.

Examples of aliphatic polyhydric alcohols are glycols, such as ethylene glycol (1,2-etnanediol), propylene glycol (2,3-propanediol), trimethylene glycol (1,3-propanediol), dimethylethylene glycol (2,3-buranediol), tetramethylene glycol (1,4-butanediol), pentamethylene glycol (1,5-pentanediol) and hexamethylene glycol (1,6-hexanediol), glycerol (1,2,3-propanetriol), 2,2-bis-hydroxymethyl-1-butanol, tetritols, such as erythritol and pentaerythritol (2,2-bis-hydroxymethyl-1,3-propanediol), pentitols, such as arabitol, xylitol and methylpentitol, and hexitols, such as mannitol and sorbitol. Examples of cycloaliphatic polyhydric alcohols are cyclohexanediols, cyclohexanetriols and inositol. Aliphatic dihydric and trihydric alcohols, such as ethylene glycol and glycerol, are preferred because of their availability.

The essential constituents, i.e., the polydiorganosiloxanes (A), polyorgano-H-siloxanes (B), platinum catalysts (C) and compound (D), are employed in the compositions which can be cured and foamed in accordance with this invention, for example, in the following amounts.

100 parts by weight of polydiorganosiloxanes (A) containing vinyl groups,
0.01 to 50 parts by weight of polyorgano-H-siloxanes (B), in which at least one Si-H group is present per vinyl group in (A),
0.1 to 200, and more preferably from 0.5 to 200, ppm of platinum as the platinum catalyst (C), and
0.01 to 10 parts by weight of the saturated polyhydric alcohol (D).

It is preferred that (D) be present in amount such that from 0.05 to 2 parts by weight of hydroxyl group is present for each 100 parts by weight of (A). In addition to the polydiorganosiloxanes (A), polyorgano-H-siloxanes (B), platinum catalyst (C) and saturated polyhydric alcohol (D), the compositions which can be cured and foamed in accordance with this invention can also contain other constituents.

Other constituents which may be employed in the compositions of this invention to improve the strength of the elastomeric foams are reinforcing and non-reinforcing fillers. Examples of reinforcing fillers are silicon dioxides such as those obtained by pyrogenic means or precipitated and have a specific surface area of at least 50 m$^2$/g, as determined by the BET method, highly active grades of carbon black and inorganic and organic fibers. The silicon dioxides can be pretreated with silanizing agents, such as hexamethyldisilazane or divinyltetramethyldisilazane. Treatment of the fillers with silanizing agents adds triorganosilyl groups to the surface of the fillers which results in substantially improved dispersibility of the fillers in the composition.

Examples of non-reinforcing fillers are ground quartz, diatomaceous earths, titanium dioxide, calcium carbonate and talc.

It is preferred that the reinforcing fillers be employed in amounts of from 5 to 40 parts by weight and the non-reinforcing fillers are preferably employed in amounts of from 5 to 150 parts by weight, based on 100 parts by weight of the polydiorganosiloxane (A) containing vinyl groups.

When a long pot life is desired for processing and/or for curing the curable and foamable compositions at elevated temperatures, curing inhibitors can be employed in the compositions of this invention. Examples of curing inhibitors which may be employed are benzotriazole, cyclosiloxanes containing vinyl groups or organic or organosilicon compounds substituted by alkynyl groups, i.e., compounds such as 3-methyl-1-butynol and 1-ethynyl-1-cyclohexanol. The amounts to be employed depend on the amount of platinum employed and on the desired curing characteristics. Usually, at least 1 ppm (parts per million) of the inhibitor is required per ppm of platinum.

In addition, it is also possible for other additives to be present in the compositions of this invention, such as inorganic or organic pigments, antioxidants, heat stabilizers and agents for improving the electrical properties.

The individual constituents of the curable and foamable compositions can be mixed together in any desired manner, for example, in stirring apparatuses, mixers, kneaders or roll mills.

Since, in most cases, it is not possible, even in the presence of curing inhibitors, to eliminate premature curing even at room temperature it is preferred that the mixtures be packaged separately for storing. Preferably, the platinum catalysts (C) and the polyorgano-H-siloxanes (B) are kept in separate containers. In the formation of elastomeric foams, the compositions are mixed in any known manner, and the mixtures are cured at temperatures within the range of from preferably 100° to 200° C., with simultaneous foaming, until, for example, coatings, foam extrudates or foam moldings are formed.

EXAMPLE

About 100 parts by weight of a polydimethylsiloxane having terminal vinyldimethylsiloxy groups and a viscosity of about 100,000 mPa.s at 25° C. were mixed with 20 parts by weight of a treated silicon dioxide which was obtained by pyrogenic means, and has a specific surface area of 200 m$^2$/g, as measured by the BET method. The silicon dioxide was treated with hexamethyldisilazane. The resultant free-flowing mixture was mixed with 5 ppm of a platinum divinyltetramethyldisiloxane complex, 0.06 part by weight of 3-methyl-1-butynol, 0.2 part by weight of a polymethyl-H-siloxane containing terminal trimethylsiloxy groups and having a viscosity of 150 mPa.s at 25° C., and 0.5 part by weight of glycerol. The flashpoint of the resultant mixture in the uncured state was >146° C., measured in accordance with the method described in DIN 51,376. This mixture was poured into a mold and cured for 10 minutes in an oven at 150° C. After the mixture had been taken out of the oven and cooled, its volume was found to have doubled compared with the composition originally employed, and the elastomeric foam thus obtained exhibited a uniform, essentially closed pore structure, and was highly flexible, resistant to mechanical fracture and odorless. The foam density was 0.5 g/cm$^3$.

When other polyhydric alcohols were employed instead of glycerol, elastomeric foams having essentially closed pores were also obtained under substantially the same conditions.

The nature and amount of polyhydric alcohols and the foam densities achieved are listed in the following table:

TABLE

| Parts by weight | Polyhydric alcohol | Foam density, g/cm$^3$ |
|---|---|---|
| 0.5 | 1,2-ethanediol | 0.5 |
| 0.5 | 2,2-bis-hydroxymethyl-1-butanol | 0.6 |
| 0.5 | 2,2-bis-hydroxymethyl-1,3-propanediol | 0.3 |

What is claimed is:

1. A composition which can be cured to form elastomeric foams consisting essentially of (A) polydiorganosiloxanes having vinyl groups, (B) polyorganohydrogensiloxanes having terminal groups which are selected from the group consisting of hydrogen, alkyl radicals having from 1 to 8 carbon atoms, aryl radicals and fluoroalkyl radicals having from 3 to 8 carbon atoms, (C) a platinum catalyst, and (D) a saturated polyhydric alcohol which is free of carbonyl groups and Si atoms and contains at least two hydroxyl groups per molecule.

2. The composition of claim 1 in which the polyhydric alcohol (D) is selected from the group consisting of aliphatic dihydric alcohols and trihydric alcohols.

3. The composition of claim 2 in which the polyhydric alcohol (D) is ethylene glycol.

4. The composition of claim 2 in which the polyhydric alcohol (D) is glycerol.

5. The composition of claim 1, wherein the composition contains curing inhibitors.

6. The composition of claim 1, which contains 100 parts by weight of polydiorganosiloxanes (A) having vinyl groups, 0.01 to 50 parts by weight of polyorganohydrogensiloxanes (B), 0.1 to 200 ppm of platinum as the platinum catalyst (C) and 0.01 to 10 parts by weight of a saturated, polyhydric alcohol (D), the amount of polyhydric alcohol (D) being such that the hydroxyl group content is from 0.05 to 2.0 parts by weight per 100 parts by weight of (A).

7. A process for preparing an elastomeric foam from polydiorganosiloxanes as the result of crosslinking by the addition reaction, which consists essentially of mixing together 100 parts by weight of polydiorganosiloxanes (A) containing vinyl groups, 0.01 to 50 parts by weight of polyorganohydrogensiloxanes having terminal groups which are selected from the group consisting of hydrogen, alkyl radicals having from 1 to 8 carbon atoms, aryl radicals and fluoroalkyl radicals having from 3 to 8 carbon atoms (B), 0.1 to 200 ppm of platinum as the platinum catalyst (C), 0.01 to 10 parts by weight of a saturated polyhydric alcohol (D), which is free of carbonyl groups and Si atoms and contains at least two hydroxyl groups per molecule, from 5 to 40 parts by weight of a reinforcing filler and from 0 to 150 parts by weight of non-reinforcing filler, and thereafter curing the resultant mixture at temperatures of from 100° to 200° C. to form the elastomeric foam.

8. The composition of claim 1, wherein the composition contains from 5 to 40 parts by weight of a reinforcing filler, based on 100 parts by weight of polydiorganosiloxanes (A).

* * * * *